Figure 1:
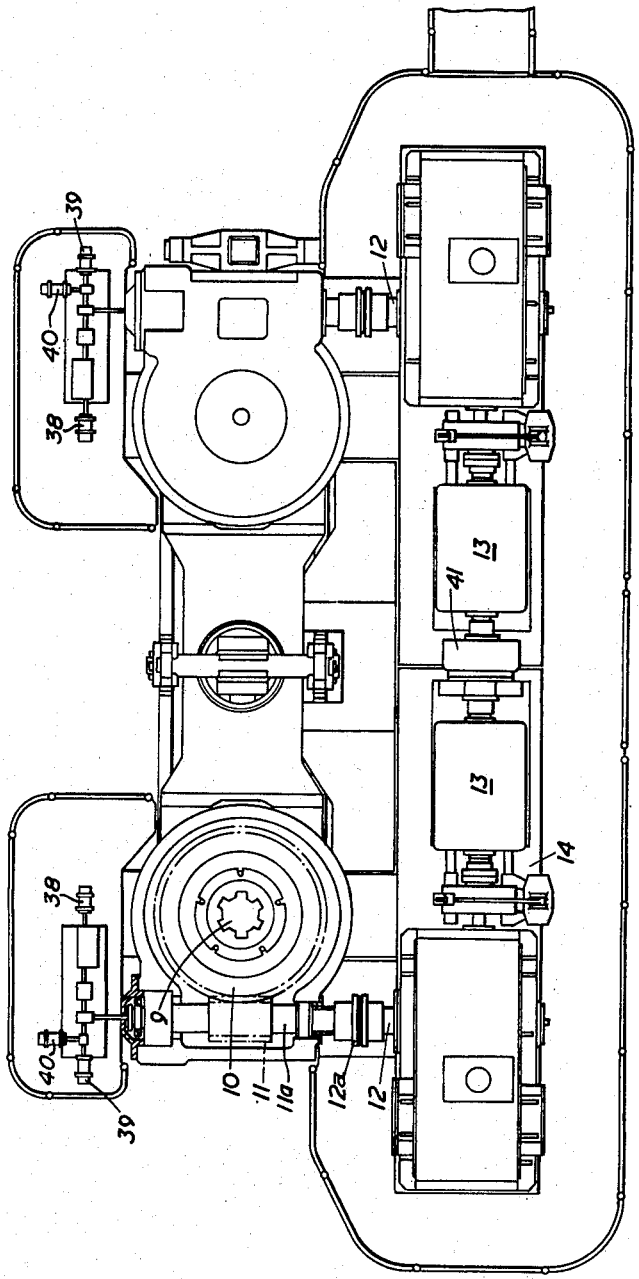

Sept. 8, 1964 L. ALLEN 3,147,650
ROLL ADJUSTING GEAR FOR ROLLING MILLS AND LIKE APPLICATIONS
Filed April 25, 1961 6 Sheets-Sheet 4

INVENTOR
LESLIE ALLEN
BY
ATTORNEY

INVENTOR
LESLIE ALLEN

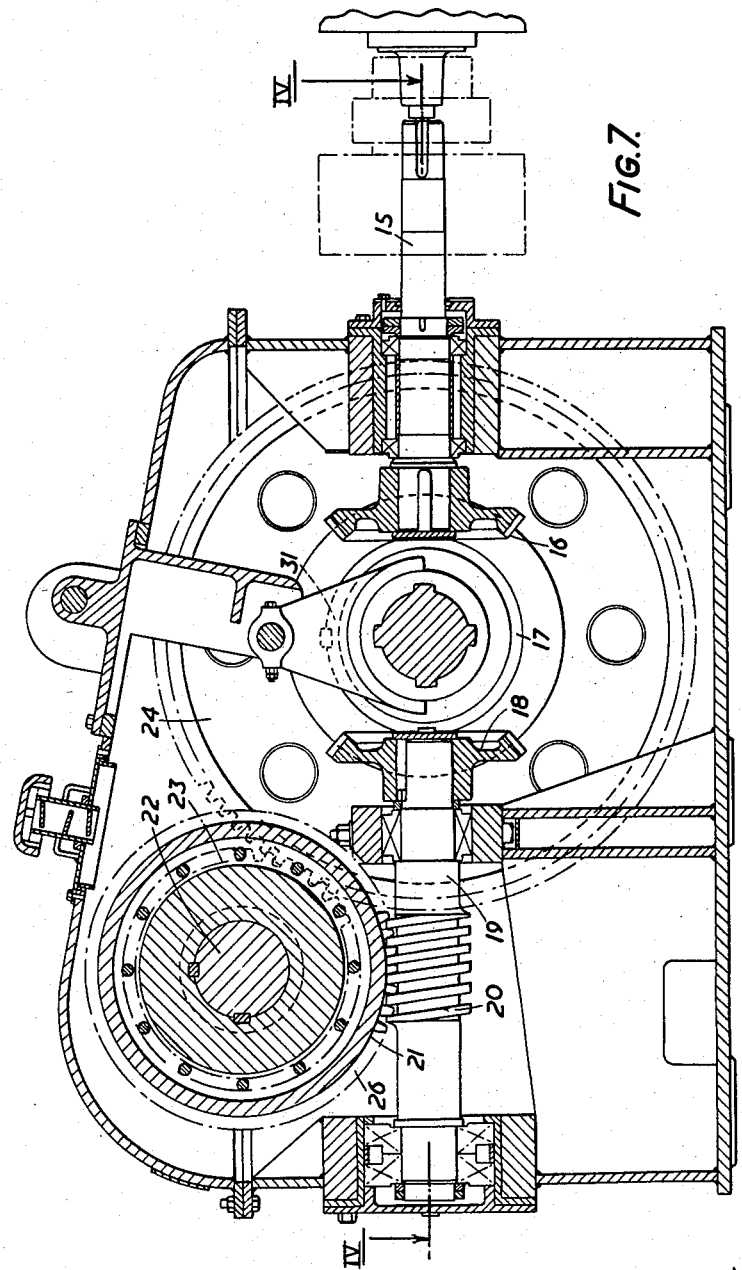

United States Patent Office 3,147,650
Patented Sept. 8, 1964

3,147,650
ROLL ADJUSTING GEAR FOR ROLLING MILLS AND LIKE APPLICATIONS
Leslie Allen, Sheffield, England, assignor to Davy and United Engineering Company Limited
Filed Apr. 25, 1961, Ser. No. 105,395
Claims priority, application Great Britain Apr. 26, 1960
6 Claims. (Cl. 80—56)

This invention is concerned with improvements in rolling mills having screw-down arrangements for varying the roll gap.

In plate mills and mills with a similar duty it is important to be able to adjust the rolls very quickly between passes because the reduction taken in a pass, particularly on thick materials, is very great. For example, in the earlier passes on plate it is quite common to take as much as one to one and a half inches of draft on a fourteen inch thick slab, whereas when the plate is reaching its final thickness it becomes essential to adjust the rolls very finely by a few thousandths of an inch or so. It is difficult to do this with one set of screw-down gear. Previously proposed solutions of this problem have suffered from various disadvantages which the present invention aims to overcome.

According to the present invention there is provided a rolling mill including a pair of work rolls and means for adjusting the roll gap, the means including a pair of roll adjustment members, and driving means in respect of each roll adjustment member, each driving means including a drive shaft and first and second gear trains coupled to the drive shaft, the output member of both trains being freely rotatable about a driven shaft for driving the roll adjustment member, a toothed clutch member being movable upon the driven shaft to couple one or other of the output members to the shaft in accordance with the drive speed ratio desired between the drive shaft and the driven shaft.

According to the present invention there is further provided a rolling mill having a pair of work rolls, one of which is movable toward and away from the other to vary the roll gap, a pair of roll adjustment members being provided each adjustment member being operable by a driven shaft of driving means provided for that member, the driving means comprising a drive shaft coupled to a first and a second gear train, the output member of the first gear train being a member of the second gear train and the output members of the two trains being freely rotatable about the driven shaft, a toothed clutch member being splined to and axially movable upon the driven shaft to couple one or other of the output members to the driven shaft in acordance with drive speed ratio desired between the drive shaft and the driven shaft.

Figure 2:
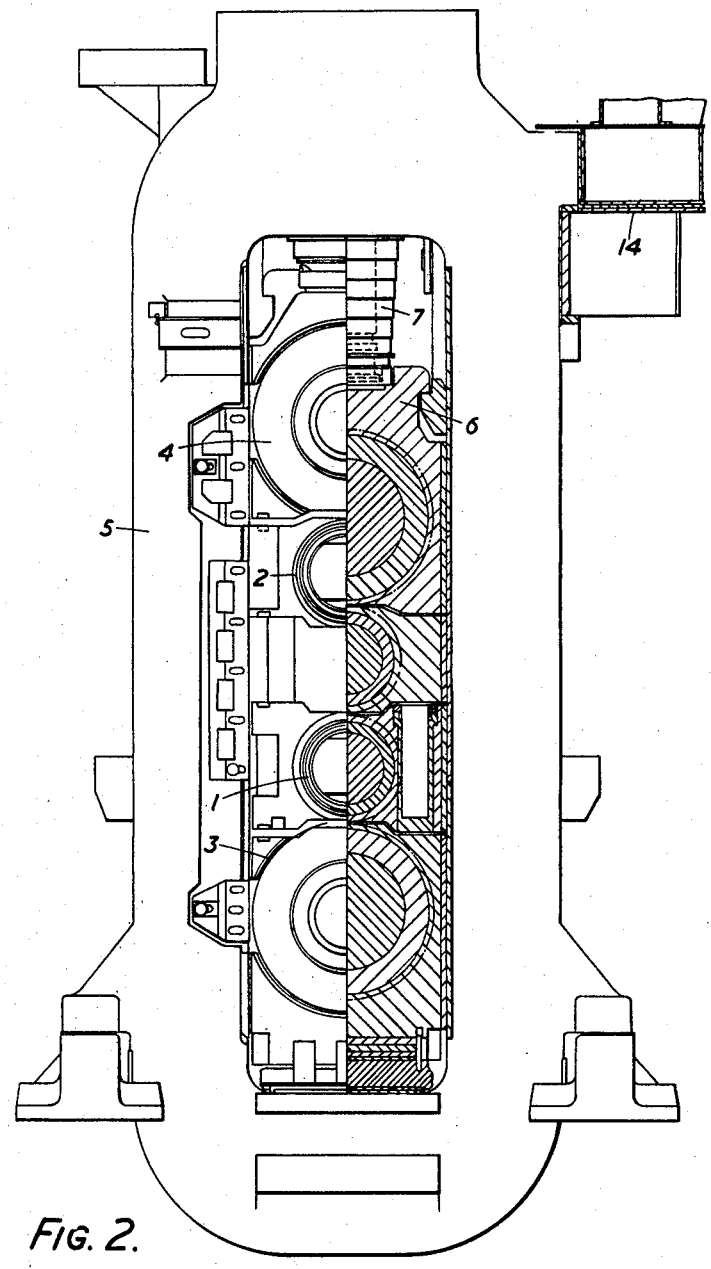
Figure 3:
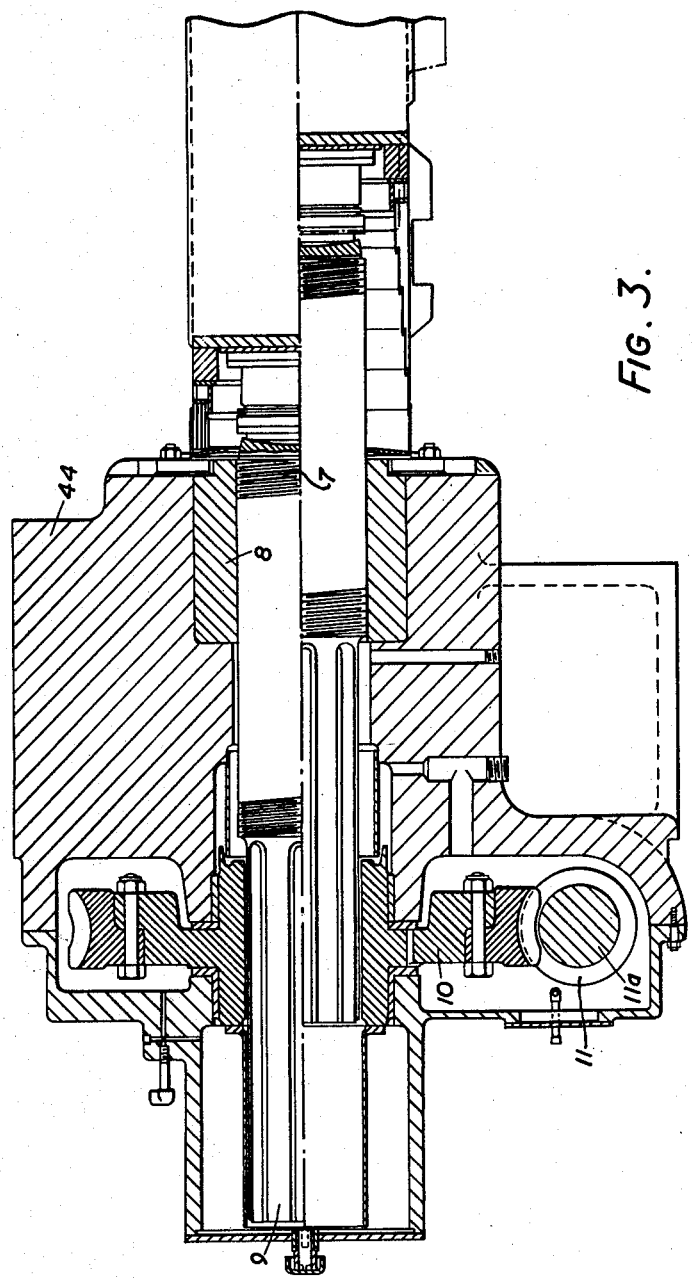
Figure 4:
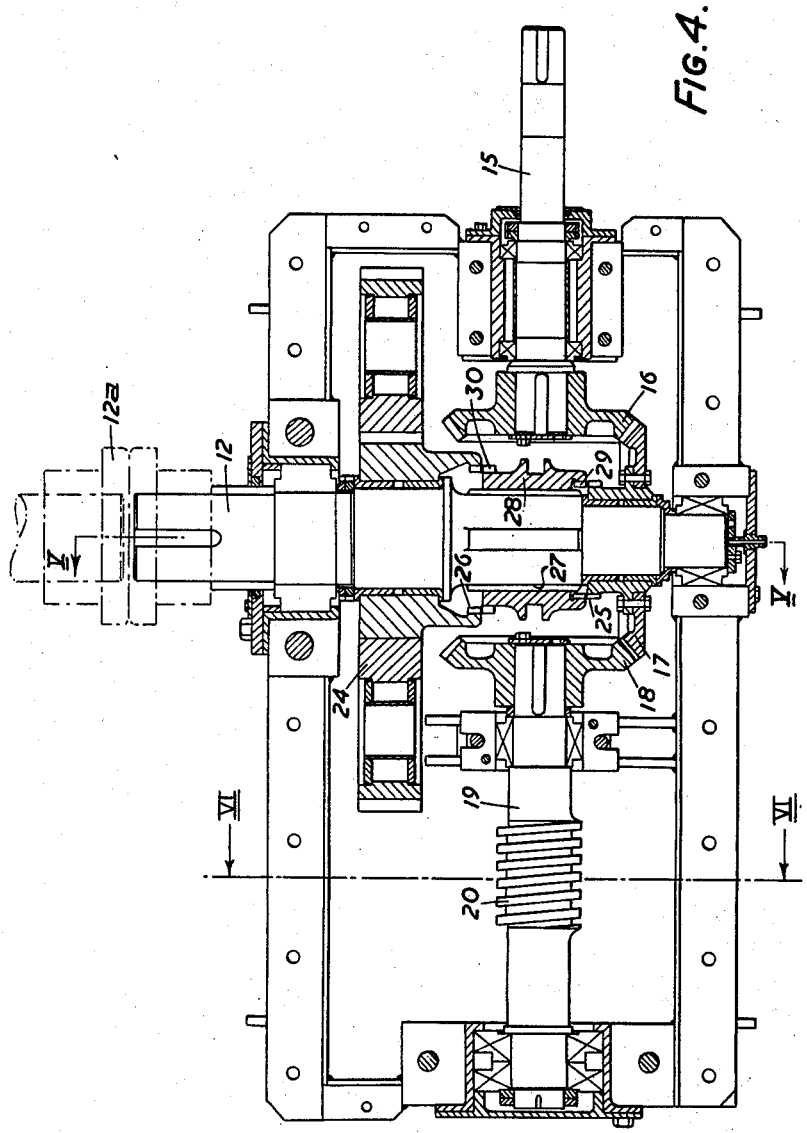
Figure 5:
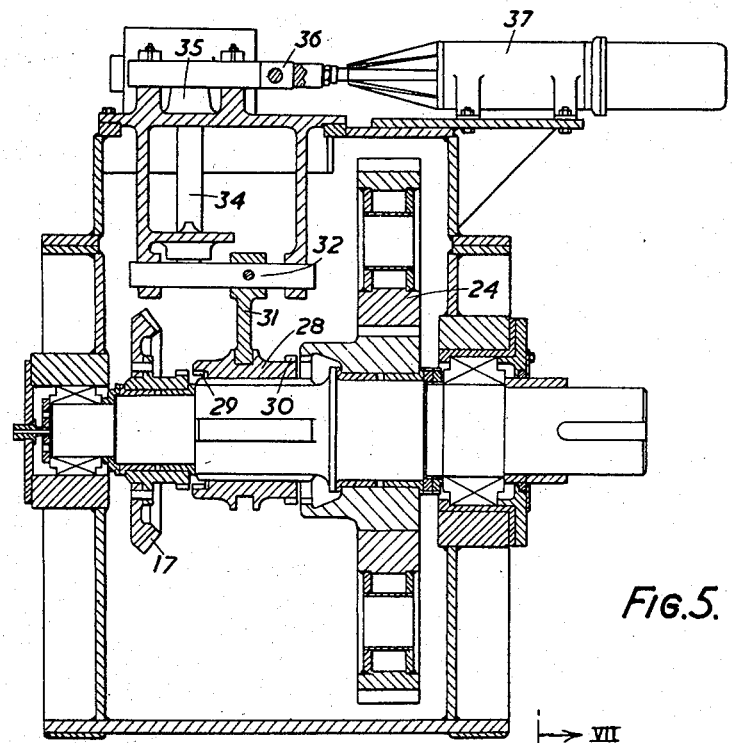
Figure 6:
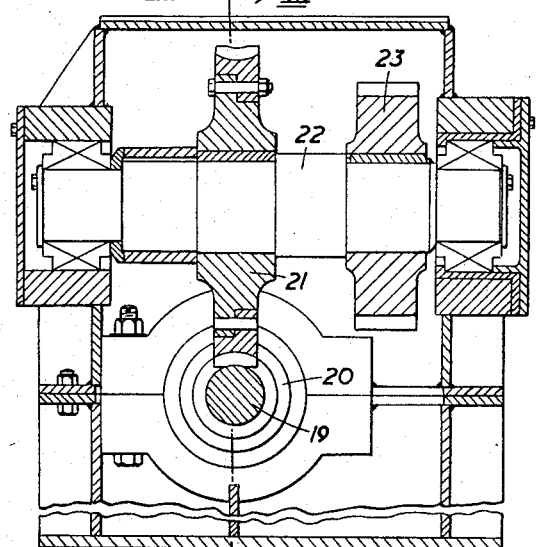

In order that the present invention may be well understood there will now be described one embodiment thereof, given by way of example only, reference being had to the accompanying drawings in which:

FIGURE 1 is a plan view of a roll stand;
FIGURE 2 is a part sectional side elevation of the roll stand;
FIGURE 3 is a section of one roll adjustment member;
FIGURE 4 is a sectional plan of part of the drive to the roll adjustment member, being a section on the line IV—IV of FIGURE 7;
FIGURE 5 is a section on the line V—V of FIGURE 4;
FIGURE 6 is a section on the line VI—VI of FIGURE 4; and
FIGURE 7 is a section on the line VII—VII of FIGURE 6.

The roll stand comprises work rolls 1, 2 and a pair of backing rolls 3, 4, the rolls being journalled in a supporting structure generally indicated at 5. The upper work roll is urged downwardly by means of the backing roll which is journalled in bearing blocks 6 movable vertically in the supporting structure. To limit upward movement of the backing roll 4 and to define the roll gap, there is provided a roll adjustment member 7 at each end of the roll 4. As may be seen from FIGURE 3, each member 7 is threaded in a captive nut 8 held in a part of the supporting structure. The upper end of the roll adjustment member 7 is splined as at 9, the splined portion carrying a worm wheel 10 in engagement with a worm 11 on a shaft 11a. The worm shaft 11a is coupled to a driven or output shaft 12 of drive means for that adjustment member through a breaker coupling 12a provided to prevent excessive torque on the driven member, e.g. in the event of roll jamming. The drive to each worm 11 comprises a driving motor 13, mounted upon a platform 14 on the supporting structure. Each motor has a drive shaft 15 to which is coupled a first bevelled gear 16 (FIGURE 4) in mesh with a second bevelled gear 17 freely rotatable on the output shaft 12. Also in mesh with the bevelled gear 17 is a third bevelled gear 18 carried on a shaft 19 which includes a worm 20. This worm engages a worm wheel 21 (FIGURES 6 and 7) on a shaft 22 to which is keyed a pinion 23, itself in mesh with a gear wheel 24, also freely rotatable on the output shaft 12. The second bevelled gear 17 includes a set of teeth 25 (FIGURE 4) and the gear wheel 24 includes a second set of teeth 26. Between the second bevelled gear and the gear wheel 24 is mounted on splines 27 a toothed clutch member 28 having teeth sets 29 and 30. By movement of the member 28 along the output shaft 12 either the first gear train 16, 17 may be coupled to the shaft 12 by engagement of the teeth 29 of the member 28 and the teeth 25 of the bevelled gear 17, or the second gear train, of which the gear 17 is one member, can be coupled to the output shaft by engagement of the teeth 30 of the member 28 with the teeth 26 of the output pinion 24 of the second train. Hence, the output shaft 12 may be driven at one of two speeds in accordance with the degree of roll adjustment to be effected.

In order to move the member 28 there is provided a fork 31 (FIGURE 5) carried by a rack 32 movable by a pinion on a shaft 34 carrying a second pinion 35 movable by a rack 36 operable by a solenoid 37. The arrangement is such that in either of the extreme positions of the member 28 a retaining force is maintained on that member to hold it in engagement.

The teeth 29, and 30 of the member 28 are chamfered greatly and the backlash between these teeth is above normal to facilitate clutch engagement.

The control of the drive is effected remotely from the control cabin of the mill and preferably is such that as either train is fully engaged by the member 28 a signal light appears at the control cabin, and furthermore it is preferable to arranged that the screwdown motors cannot be started up until there is proper engagement of the member 28 at both sides of the stand. Additionally, the worm shaft 11a is extended beyond the worm 10 to drive selsyns 38, 39, and 40 at different speeds to provide indications of the angular disposition of the shaft 11a with different degrees of accuracy.

The drive motors 13 are coupled by means of a magnetic coupling 41 and in order to obtain roll end setting the magnetic coupling may be disconnected and one motor operated independently of the other.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A rolling mill screwdown drive comprising a rolling mill housing, a screw threaded into said housing, rotary drive means for said screw, a drive shaft coupled to said drive means, a driven shaft coupled to said screw, a first gear and a second gear spaced apart axially on said driven shaft and each freely rotatable on said driven shaft, a toothed clutch member splined to said driven shaft and movable axially between said first and second gears for coupling said first gear and said second gear alternatively to said driven shaft, gear means, for continuously driving said first gear from said drive shaft, and a gear train for continuously driving said second gear from said drive shaft, said gear means and train driving said first and second gears in the same direction.

2. A rolling mill according to claim 1 in which the toothed clutch member is movable by a solenoid operated rack.

3. A rolling mill according to claim 1 in which the first gear is a first bevel gear and the gear train comprises the gear means, the first bevel gear, a second bevel gear mounted on a shaft in mesh with the first bevel gear, a worm on the second bevel gear shaft, a worm wheel in engagement with the worm, and a pinion fixed for rotation with the worm wheel and being in driving mesh with the second gear.

4. A rolling mill according to claim 1 in which the rotary drive means is coupled to a plurality of selsyns arranged to indicate the angular disposition of the rotary drive means.

5. A rolling mill screwdown drive comprising a rolling mill housing, a screw threaded into said housing, rotary actuating means for said screw, a driven shaft coupled to said screw, a first bevel gear and a second gear spaced apart axially on said driven shaft and each freely rotatable on said driven shaft, a toothed clutch member splined to said driven shaft and movable axially between said first and second gears for coupling said first and second gears alternatively to said driven shaft, a drive shaft coupled to and driven by said actuating means, a second bevel gear fast on said drive shaft and meshing with said first bevel gear for continuously driving said first bevel gear, a third shaft, a third bevel gear fast on said third shaft and meshing with said second bevel gear, and a gear train in continuous driving engagement between said third shaft and said second gear.

6. A rolling mill screwdown device comprising a drive shaft, a driven shaft at right angles to said drive shaft, a first bevel gear fast on said drive shaft, a second bevel gear freely rotatable on said driven shaft having a first set of teeth meshing with said first bevel gear, and a second set of teeth, a third shaft having a worm thereon, a third bevel gear fast on said third shaft and meshing with said second bevel gear, a fourth shaft, a worm wheel fast on said fourth shaft and in driven engagement with said worm, a fourth gear also fast on said fourth shaft, a fifth gear freely mounted on said driven shaft having a first set of teeth meshing with said fourth gear, and a second set of teeth and a clutch member splined on said driven shaft and movable on said shaft between said second sets of teeth for clutching said second bevel gear and said fifth gear alternatively to said driven shaft.

References Cited in the file of this patent

UNITED STATES PATENTS

| | | |
|---|---|---|
| 1,990,051 | Schreck | Feb. 5, 1935 |
| 2,090,221 | Morgan | Aug. 17, 1937 |
| 2,784,610 | Block | Mar. 12, 1957 |